Figure 1:
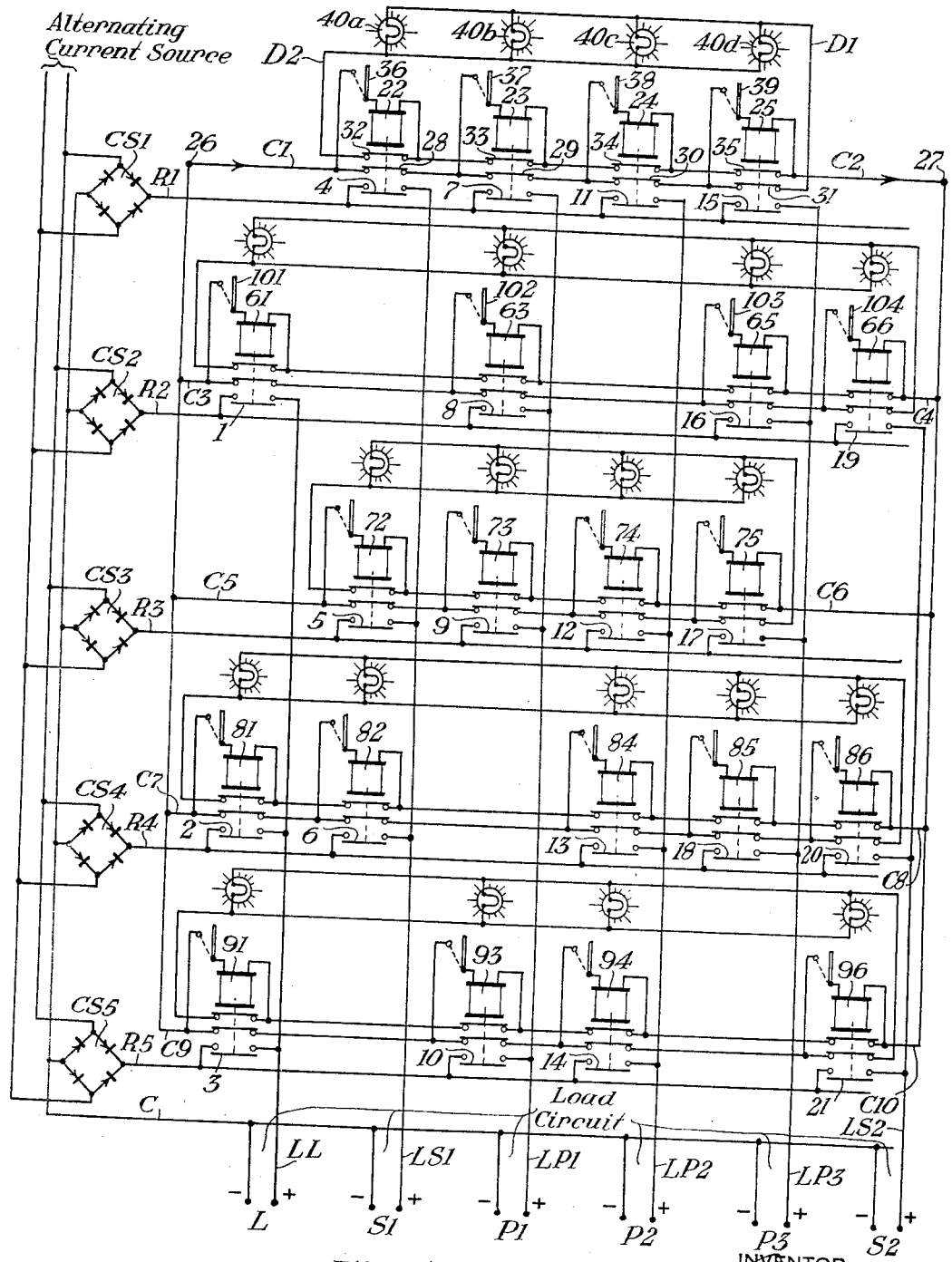

March 18, 1941.  S. A. STEVENS  2,235,540
CONTROL SYSTEM FOR ALTERNATIVE SOURCES OF SUPPLY OF ELECTRIC CURRENTS
Filed Jan. 18, 1938  2 Sheets-Sheet 1

INVENTOR
Sydney Arthur Stevens.
BY
HIS ATTORNEY

Patented Mar. 18, 1941

2,235,540

UNITED STATES PATENT OFFICE 2,235,540

CONTROL SYSTEM FOR ALTERNATIVE SOURCES OF SUPPLY OF ELECTRIC CURRENTS

Sydney Arthur Stevens, London, England, assignor, by mesne assignments, to The Union Switch & Signal Company, Swissvale, Pa., a corporation of Pennsylvania Application January 18, 1938, Serial No. 185,574
In Great Britain January 22, 1937

7 Claims. (Cl. 171—97)

This invention relates to control systems for alternative sources of supply of electric currents for a relatively large number of load circuits and particularly, although not exclusively, to systems of this character for controlling the supply of rectified alternating current from a relatively large number of rectifiers to a relatively large number of load circuits such as, for example, the load circuits constituted by the light projection apparatus employed in cinemas and the like.

In control systems of this kind it is necessary to provide for the alternative supply of current to each projection device from two or more sources so as to allow for failure of any source during operation and existing arrangements for this purpose involving two alternative sources of current supply necessitate each of these sources being of sufficient capacity to provide the full current required for all the devices in operation at a time thus involving relatively large supply units with a correspondingly heavy cost of installation required.

The present invention has for one of its objects to overcome this disadvantage and according to the principal feature of the invention a larger number of sources of supply of current is provided, each of these sources being of such capacity as to supply only a fraction of the current required for each or certain of the load circuits, the sources being arranged to be connected to each of such circuits in pairs or groups and the total number of sources being such that at least two alternative pairs or groups are available for each of such load circuits. By this arrangement the sum of the capacities of the several sources may be arranged to be considerably less than when only two alternative sources of current are provided with a consequent economy as regards cost of installation and operation.

Another object of the invention is to provide arrangements for preventing an overload on any of the supply sources or rectifiers so that when one or more of these sources or rectifiers has been connected to a projector or other device to be operated therefrom, the rectifier or rectifiers thus connected cannot be connected to any other projector or device.

According to this feature of the invention contactors or relays provided for connecting the rectifiers to the devices to be operated are provided with suitable interlocking arrangements for this purpose. The terms "contactor" and "relay" are in the instant specification used interchangeably in referring to circuit controlling electromagnets.

Figure 2:
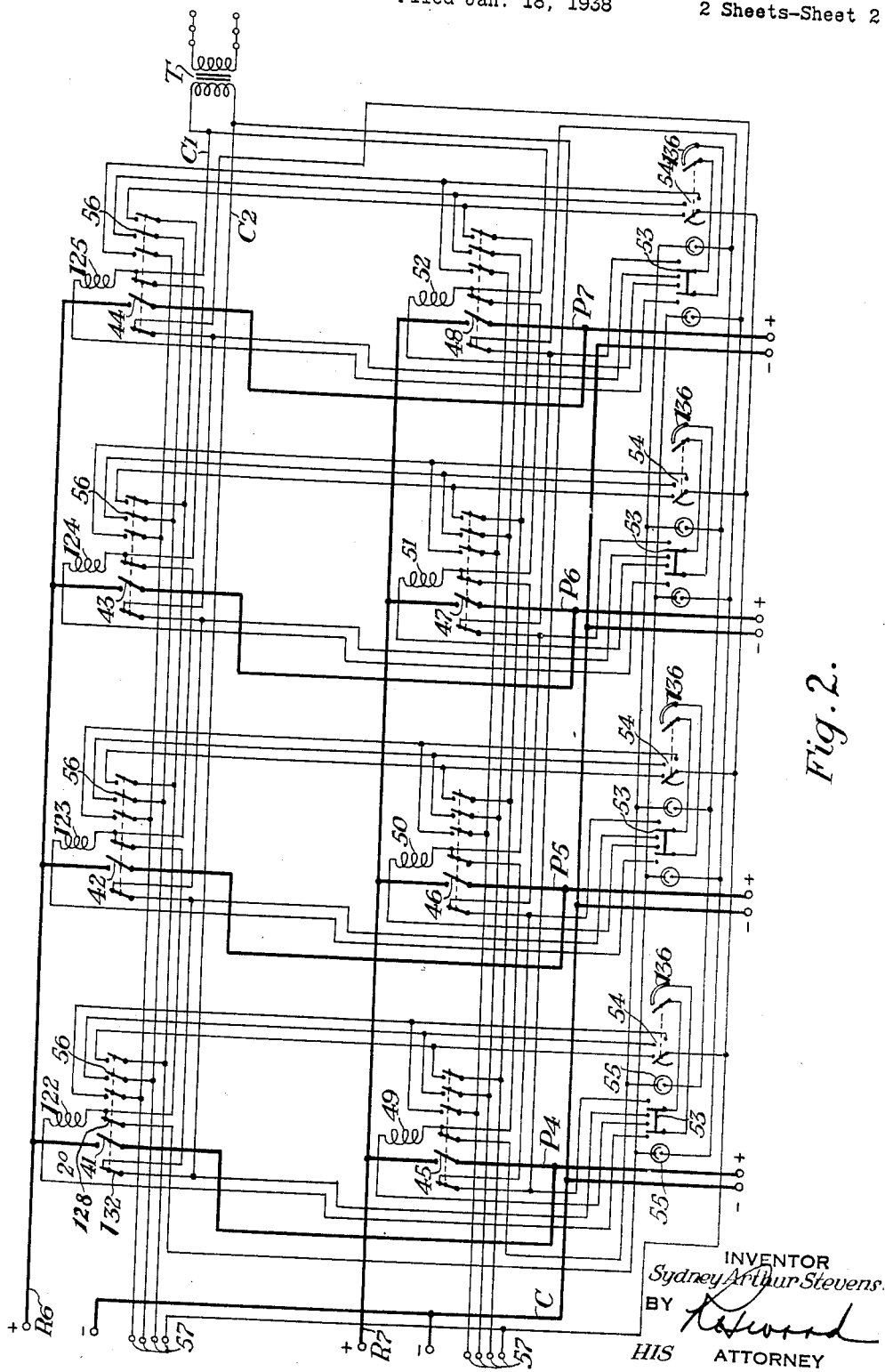

The invention is illustrated by way of example in the accompanying drawings of which Figure 1 is a diagrammatic view of a system of load circuits constituted by cinema light projection apparatus adapted to be operated from a number of rectifiers in accordance with the principal feature of the invention together with a system of control circuits illustrating the principle of the interlocking arrangements for a number of contactors or relays for connecting the supply rectifiers to the devices to be operated in accordance with the further features of the invention. Figure 2 is a diagram of connections for a more complete interlocking system of control.

Referring now first to Figure 1, the invention is illustrated as applied to a system of load circuits constituted by cinema light projection apparatus comprising three projectors, two spot lights and one slide lantern, and which load circuits are identified by the reference characters P1, P2, P3, S1, S2 and L, respectively. Each of the three projectors requires a current of approximately 150 amperes, the currents required by each spot light and the slide lantern being approximately 75 amperes and 50 amperes respectively. That is to say, the load circuits L, S1, P1, P2, P3 and S2 require the current supply of 50, 75, 150, 150, 150, and 75 amperes, respectively. Since the normal peak or maximum load is constituted by one projector, the two spot lights and the slide lantern, a total current of approximately 350 amperes will require to be supplied and if, as has hitherto been customary, two alternative supply rectifiers are provided, the rectifier installation must have a correspondingly total capacity which, although the peak load is of short duration, may have to be 700 amperes to provide sufficient standby against failure.

For this system of load circuits, according to the invention, there is provided, for example, five supply rectifiers each having a capacity of 75 amperes, and which rectifiers are identified by the reference characters CS1, CS2, CS3, CS4 and CS5, respectively.

Each of the five rectifiers has its input terminals connected across a convenient source of alternating current such as a generator not shown. The positive output terminals of the rectifiers CS1, CS2, CS3, CS4 and CS5 are connected to rectifier bus bars R1, R2, R3, R4 and R5, respectively. The negative output terminals of the rectifiers are all connected to a common bus bar identified by the reference character C, and to which bus bar the negative side (—) of each of the load circuits L, S1, P1, P2, P3 and S2 is also connected. The positive sides (+) of the load circuits are connected to load bus bars LL, LS1, LP1, LP2, LP3 and LS2, respectively.

Switch devices preferably in the form of electromagnets which operate circuit controlling contacts are provided for effecting electrical connection between the rectifier bus bars and the load bus bars. As shown in Fig. 1, each rectifier bus bar is provided with a series or group of relays, one relay for each load bus bar to which the respective rectifier bus bar is to be connected. Looking at rectifier bus bar R1, a series of four relays 22, 23, 24 and 25 is provided. Relay 22 when energized to close a front contact 4 connects rectifier bus bar R1 to the load bus bar LS1 of the load circuit S1; relay 23 when energized to close a front contact 7, connects rectifier bus bar R1 to the load bus bar LP1; relay 24 when energized to close a front contact 11 connects rectifier bus bar R1 to load bus bar LP2; and relay 25 when energized to close a front contact 15 connects bus bar R1 to load bus bar LP3. In like fashion, the rectifier bus bar R2 is provided with a series of relays including relays 61, 63, 65 and 66; relay 61 when energized to close its front contact 1 connecting rectifier bus bar R2 to load bus bar LL; relay 63 when energized to close its front contact 8 connecting bus bar R2 to load bus bar LP1; relay 65 when energized to close its front contact 16 connecting bus bar R2 to load bus bar LP3; and relays 66 when energized to close its front contact 19 connecting bus bar R2 to load bus bar LS2. Again, rectifier bus bar R3 is provided with a series of relays including relays 72, 73, 74 and 75 provided with front contacts 5, 9, 12 and 17, respectively, and by which contacts the rectifier bus bar R3 can be connected with the load bus bars LS1, LP1, LP2 and LP3, respectively. Similarly, rectifier bus bar R4 is provided with a series of relays 81, 82, 84, 85 and 86 having front contacts 2, 6, 13, 18 and 20, respectively, and by which contacts the rectifier bus bar R4 can be connected to the respective load bus bars LL, LS1, LP2, LP3 and LS2. A series of relays 91, 93, 94 and 96 is provided for the rectifier bus bar R5, the bus bar R5 being connected with the load bus bars LL, LP1, LP2, and LS2 through the medium of the respective front contacts 3, 10, 14 and 21 of relays 91, 93, 94 and 96, respectively. It is clear, therefore, that each of the supply rectifiers CS1, CS2, CS3, CS4 and CS5 can be connected with selected ones of the load circuits by energizing the corresponding relay of the associated series of relays. It should be pointed out that, as shown in Fig. 1, each such series of relays does not include a relay for each load bus bar and hence each supply rectifier can be connected to only certain ones of the load circuits. It is apparent, however, that if desired each series of relays can include a relay for each load bus bar so that each rectifier can be connected to any one of the load circuits.

Thus load bus bar LL can, through circuit controlling contacts 1, 2 and 3, be connected to bus bars R2, R4 and R5. The load circuit L, which as here assumed requires a current supply of 50 amperes, can be, therefore, supplied from any one of the rectifiers CS2, CS4 or CS5. The load circuit S1, which as here assumed requires a current supply of 75 amperes, can be supplied from rectifier CS1, CS3 or CS4, since load bus bar LS1 through circuit controlling contacts 4, 5 and 6 can be connected with the rectifier bus bars R1, R3 and R4. Load bus bar LP1 can, through contacts 7, 8, 9 and 10, be connected with rectifier bus bars R1, R2, R3 and R5; and thus the load circuit P1 which requires a current supply of 150 amperes can be supplied from any pair of the rectifiers CS1, CS2, CS3 and CS5, so as to be supplied with current of 75 amperes from each of the rectifiers of the alternative pair of rectifiers selected. The second projector load circuit P2 can through contacts 11, 12, 13 and 14 be similarly connected with any pair of the rectifiers CS1, CS3, CS4 and CS5. The third projector load circuit P3 which also requires a current supply of 150 amperes can, through contacts 15, 16, 17 and 18, be connected to any pair of rectifiers CS1, CS2, CS3 and CS4. Again, load circuit S2 which requires a current supply of 75 amperes can, through contacts 19, 20 and 21 be connected with any one of the rectifiers CS2, CS4 and CS5. It follows that load circuits L, S1 and S2, each of which requires a current supply not greater than the maximum current supplied by the individual rectifiers, can be supplied with current from alternative sources each of which sources includes an individual rectifier. Also, the load circuits P1, P2 and P3, each of which requires a current supply equal to the maximum output of two rectifiers, can be supplied from alternative pairs of the rectifiers.

It is to be understood, of course, that my invention is not limited to load circuits and current sources of the capacity and arrangement here recited and this one combination of load circuits and supply rectifiers will serve to illustrate the flexibility of apparatus embodying my invention.

In order to prevent an overload on any supply rectifier it is evident that while a circuit controlling contact is closed to connect the associated rectifier bus bar to a load bus bar, no other relay of the same series of relays must be energized to close its front contact and connect that rectifier bus bar to another load bus bar. To this end, a suitable interlocking arrangement for the control of the relays of each series of relays is provided. A preferred form for such interlocking control of the relays of each series of relays is disclosed in Fig. 1.

Looking at relays 22, 23, 24 and 25 of the series of relays provided for rectifier bus bar R1, a control circuit including a pair of bus bars or control conductors C1 and C2 extending from the two terminals 26 and 27 of any convenient source of current such as a generator not shown is provided. Starting at relay 22 at one end of the series of relays, the conductor C1 serially includes back contacts 28, 29, 30 and 31 of relays 22, 23, 24 and 25, respectively. Starting at relay 25 at the other end of the series of relays, the conductor C2 serially includes back contacts 35, 34, 33 and 32 of relays 25, 24, 23 and 22, respectively. Manually operable control switches are provided one for each relay of the series of relays. As shown in Fig. 1, switches 36, 37, 38 and 39 are provided for relays 22, 23, 24 and 25, respectively. A circuit connection is provided by which the winding of each relay of the series of relays is connected across the control conductors C1 and C2 over the associated manually operable switch, the arrangement being such that any one of the relays can be selected and when any one of the relays is selected and picked up the remaining relays of the series can not be energized. Looking at relay 22, the right-hand terminal of its winding is connected with conductor C2 adjacent back contact 32 on the side toward terminal 27, and the left-hand terminal of the winding of relay 22 is connected with conductor C1 adjacent back contact 23 on the side toward terminal 26, switch 36 being interposed in the connection to conductor C1. In a similar manner the winding of each of the remaining relays 23, 24 and 25 of the series is connected to the conductors C1 and C2, and it is believed to be unnecessary to repeat the description in detail. Hence, when the control switch for any one of the relays of the series, for example the control switch 38 of relay 24, is closed, that relay is energized and picked up closing front contact 11 and opening back contacts 30 and 34. The closing of front contact 11 connects the rectifier bus bar R1 to the load bus bar LP2, as explained hereinbefore. The opening of back contacts 30 and 34 cuts off the supply of current to the other relays of the series, back contact 34 disconnecting conductor C2 from the preceding relays 22 and 23 of the series, and back contact 30 disconnecting conductor C1 from the succeeding relay 25 of the series. Therefore the energizing of any one of the relays 22, 23, 24 and 25 to connect the rectifier CS1 to the corresponding load circuit automatically prevents any other relay of the series from being energized to connect that rectifier to any of the other load circuits, so that an overload on the rectifier CS1 is avoided.

The control circuit for the series of relays including relays 22, 23, 24 and 25 is provided with an indication circuit which includes four indication lamps 40a, 40b, 40c and 40d preferably mounted adjacent the manually operable switches 36, 37, 38 and 39, respectively. These indication lamps are connected across conductors D1 and D2, conductor D1 being in turn connected with conductor C1 adjacent back contact 31 of relay 25 on the side away from the terminal 26, and conductor D2 being connected with conductor C2 adjacent back contact 32 of relay 22 on the side away from terminal 27. It follows that the indication lamps 40a, 40b, 40c and 40d are illuminated as long as all the relays of the associated series of relays are deenergized to indicate to the operator that the supply rectifier CS1 is available, but that when any one of the relays is picked up to connect the rectifier CS1 with a corresponding load circuit the lamps are extinguished and thus notify the operator that no other relay of the associated series is free to be picked up. The series of relays 61, 63, 65 and 66 provided for the rectifier bus bar R2 is controlled through the medium of a control circuit including conductors C3 and C4 connected with the terminals 26 and 27, respectively. The conductors C3 and C4 each serially include back contacts of each relay of the associated series in the same manner that conductors C1 and C2 include back contacts of each of the relays of the associated series of relays. Also the winding of each of the relays 61, 63, 65 and 66 is connected across the conductors C3 and C4 by a circuit connection similar to the circuit connection by which each of the relays 22, 23, 24 and 25 is connected across the conductors C1 and C2, and a detailed description of these latter circuit connections need not be repeated except to point out that relays 61, 63, 65 and 66 are selectively energized through the medium of the manually operable switches 101, 102, 103 and 104, respectively. Furthermore, when any one of the relays 61, 63, 65 and 66 is energized and picked up to connect the associated rectifier CS2 to a corresponding load circuit the remaining relays of the series are locked out. Also, an indication circuit including indication lamps one for each of the manually operable switches 101, 102, 103 and 104 is provided for indicating when the rectifier CS2 is available and to inform the operator when the rectifier CS2 is already connected with a load circuit and cannot be used for supplying a second load circuit.

Likewise, the series of relays 72, 73, 74 and 75 is controlled over a control circuit including conductors C5 and C6 connected with the terminals 26 and 27 of the current source; the series of relays 81, 82, 84, 85 and 86 is controlled over a control circuit including conductors C7 and C8 connected with the terminals 26 and 27; and the series of relays 91, 93, 94 and 66 is controlled over a control circuit including conductors C9 and C10 connected with the terminals 26 and 27, and each of which control circuits is similar in all respects to the control circuit described for the series of relays 22, 23, 24 and 25. Also, each control circuit is provided with an indication circuit for indicating when the associated rectifier is available and when it is already connected with a load circuit.

It is evident that with the system here described at least two alternative sources of supply of current for each load circuit are provided, and the load circuits can be operated in any combination using one projector, except for the case in which one projector, the two spotlights and the slide lantern are simultaneously required. This limitation is, however, of little importance in practice. It should also be pointed out that with the system here described the total capacity of the rectifiers is only 375 amperes as compared with 700 amperes for the existing systems previously referred to.

A further advantage of the system here described is that in the event of the combination of a projector, a spotlight and slide lantern being unable to be operated due to the failure of one or more supply rectifiers, the control switch for the relay of the rectifier bus bar which will next become available by the extinction of a projector may be closed, whereupon the corresponding relay will become energized as soon as this projector is extinguished by the opening of its control switch. This action will be particularly advantageous in the case in which a projector requiring current supplied from two rectifiers is required to be brought into operation, and only one of these rectifiers is available for the time being. This projector can, under these conditions, be started into operation by the supply of current from one rectifier only so as to strike the lamp arc, the current taken by the projector being maintained at half its normal value. As soon as the other rectifier is available, its corresponding relay will be picked up, since its control switch has been closed and the full projector current required will be supplied.

Referring now to Figure 2, a more complete system of interlocking is illustrated for an installation comprising two rectifiers and four load circuits constituted for instance by cinema projection devices or the like. The positive terminals of the rectifiers are connected to rectifier bus bars R6, R7, their negative terminals being connected to a common bus bar C. The positive terminals of the four load devices are connected to corresponding load bus bars P4, P5, P6, P7, their negative terminals being connected to the common return bus bar C.

The load bus bars P4, P5 etc., are arranged to be connected to the rectified bus bars R6 or R7, through electrically operated circuit controlling contacts indicated at 41, 42, 43, 44 and 45, 46, 47, 48. Contacts 41, 42, 43 and 44 are operated by a series of contactors or relays provided for rectifier bus bar R6 and the energizing coils 122, 123, 124 and 125 of which contactors are supplied with current over a control circuit including energising bus bars C1 and C2, which are connected through a transformer T to a suitable source of alternating current. Likewise, contacts 45, 46, 47 and 48 are operated by a series of contactors provided for rectifier bus bar R7 and the energizing coils 49, 50, 51, and 52 of which contactors are supplied with current over a control circuit connected to bus bars C1 and C2.

The control circuit for each series of contactors of Fig. 2 includes back contacts of each contactor of the series in the same manner described for the control circuit for each series of relays of Fig. 1. Thus one side of the control circuit for the series of contactors for bus bar R6 serially includes, starting from bus bar C1 at the right-hand end of the series, a back contact of each contactor up to back contact 128 of the contactor at the left-hand end of the series, and the other side of this control circuit, starting from bus bar C2 at the left-hand end of the series, includes back contact 132 of the first contactor and thence serially over a back contact of each of the other contactors of the series. Further detailed description of these control circuits of Fig. 2 is unnecessary and they will be readily understood from an inspection of Fig. 2.

The energizing coil of the respective contactor of each series of contactors of Fig. 2, is connected across the respective control circuit over a selector switch 53 and a manually operable control switch 136, there being a selector switch 53 and a control switch 136 for each pair of corresponding contactors of each series. A rectifier control switch 54 is provided for each control switch 136 and adaptable of operation in step therewith. The rectifier control switches 54 are arranged to be connected through contacts 56 operated by the contactors to conductors 57 leading to the two rectifiers, and adapted to vary the voltages impressed upon the rectifiers, and thereby vary the current supplied as required for "striking," "burning in" and "running" the projector arcs.

In operation it will be understood that so long as the contactors of each series is deenergized so that contacts 41 to 48 inclusive are all open, and the contacts at each contactor interposed in the respective control circuit closed, the bus bars C1 and C2 are energised through their entire lengths and all the pilot or indication lamps 55 are therefore illuminated.

In order to operate the projector corresponding to the bus bar P4, for example, from the rectifier bus bar R6, the selector switch 53 is moved toward the left and the control switch 54 is moved into its "strike" position, closing the associated control switch 136. A circuit is thereby completed from bus bar C1 through the closed contacts of the contactors for the contacts 44, 43, and 42, energising coil 122 of contactor for contact 41, selector switch 53 and control switch 136 to bus bar C2. The coil 122 being thus energised, the contact 41 is closed, and the rectifier bus bar R6 is thereby connected to the projector bus bar P4.

The energizing of the coil 122 effects the opening of the switch contact 128 so that the portion of the bus bar C1 beyond the contactor for contact 41 is deenergised with the result that the left hand pilot lamp 55 at each of the control switches 136 is extinguished, thereby indicating that the rectifier bus bar R6 is no longer available for connection to any projector bus bar.

In the event, however, of any of the selector control switches 53 for the projector bus bars P5, P6, P7 being moved toward the left and the corresponding control switch 136 operated, the contactor for contact 42, 43 or 44 will not be energized since the circuit of its energising coil 123, 124, or 125 will be interrupted at the open contacts 132 of the contactor for contact 41 and the corresponding contactor will consequently not be closed.

Under the conditions above described, however, the selector switch 53 of any of the projector bus bars P5, P6 or P7 can be moved toward the right to connect the corresponding energising coil 50, 51 or 52 of the contactor for contact 46, 47 or 48 to the rectified bus bar R7, and this coil will, thereupon, be energised from the bus bar C1, so as to effect the closure of the corresponding contact to connect the rectifier bus bar R7 to the desired projector bus bar.

The arrangements above described, therefore, indicate to the operator the rectifier which is available at any time, and automatically prevent a rectifier which is already in use from being connected to another projector or load device.

The invention is evidently not limited to the particular system above described and illustrated by way of example, which may be varied in many respects without exceeding the scope of the invention.

Having now particularly described and ascertained the nature of my said invention and in what manner the same is to be performed, I declare that what I claim is:

1. In a control system for alternative sources of supply of electric current for a plurality of load circuits the combination comprising, a series of electromagnets for each source with each such series including an individual electromagnet for each load circuit to which the respective source is to be connected, a contact operated by each electromagnet when energized to connect the respective source to the respective load circuit, a control circuit for each of said series of electromagnets, and manually operable interlocked circuit means for each of said series of electromagnets operable to connect any one and only one of the electromagnets of the series with the respective control circuit to energize that electromagnet whereby any one of the sources can be connected to a load circuit and each source can be connected to only one load circuit at any one time.

2. In a control system for alternative sources of supply of electric current for a plurality of load circuits the combination comprising, a series of electromagnets for each source with each such series including an individual electromagnet for each load circuit to which the respective source is to be connected, a contact operated by each electromagnet when energized to connect the respective source to the respective load circuit, a control circuit for each of said series of electromagnets, circuit means for each of said electromagnets including a manually operable switch to connect the respective electromagnet with the associated control circuit to energize that electromagnet, and contacts operated by each electromagnet when energized to prevent connection of any of the remaining electromagnets of the same series to the respective control circuit.

3. In a control system for supplying a plurality of different load circuits from a plurality of different sources of electric current when each of such sources is of such capacity as to supply only a fraction of the current required for each of the load circuits the combination comprising, a series of electromagnets for each source with each such series including an individual electromagnet for selected ones of the load circuits, a contact operated by each electromagnet when energized to connect the respective source to the respective load circuit, a plurality of control circuits one for each of said series of electromagnets, a manually operable control switch for each electromagnet, and means for each electromagnet to connect it with the respective control circuit including the respective control switch and a back contact of each of the other electromagnets of the same series whereby each load circuit can be supplied by alternative groups of the sources with each group including a number of the sources sufficient to supply the current required by that load circuit and overloading of any one of the sources by the source being connected to more than one load circuit is avoided.

4. In a control system for supplying a plurality of different load circuits from a plurality of different sources of electric current when each of such sources is of such capacity as to supply only a fraction of the current required by at least one of the load circuits the combination comprising, a series of electromagnets for each source with each such series including an electromagnet individual to each load circuit to which the respective source is to be connected, a contact operated by each electromagnet when energized to connect the respective source to the respective load circuit, a control circuit for each of said series of electromagnets, a manually operable control switch for each electromagnet, and circuit means for each electromagnet including the respective control switch and a back contact of each of the remaining electromagnets of the same series to connect that electromagnet with the respective control circuit whereby said one load circuit can be supplied by alternative groups of the sources with each group including a number of the sources sufficient to supply the current required by said one load circuit and any source not connected to said one load circuit is available to supply current to any one of the other load circuits.

5. In a control system for alternative sources of supply of electric current for a plurality of load circuits the combination comprising, a plurality of rectifiers each rated for a predetermined current supply, a plurality of load circuits at least one of which requires a current supply greater than the rated supply of any one of said rectifiers, a series of relays for each rectifier with each series including an individual relay for each load circuit to which the respective rectifier is to be connected, means controlled by each relay including a front contact of the relay to connect the respective rectifier with the respective load circuit, a control circuit for each of said series of relays, a manually operable switch for each relay, and energizing circuit means for each relay including its switch and a back contact of each of the remaining relays of the same series to connect the winding of the relay across the associated control circuit whereby a group of rectifiers can be connected to said one load circuit sufficient in number to supply the current required by said one circuit with said group selected as desired and a rectifier can not be included in such group if already connected to any one of the other load circuits.

6. In a control system for the supply of electric current from one or more of a plurality of alternating current rectifiers to one or more of a plurality of direct current load circuits at least one of which load circuits requires a current supply greater than the rated supply of any one of the rectifiers the combination comprising, a series of relays for each rectifier with each such series including a relay for each load circuit, said relays each provided with a front contact for connecting the associated rectifier with the associated load circuit, and an independent manually operable control circuit means for each of said series of relays, each of said control circuit means operative to energize any one and only one of the relays of the respective series of relays at a time to permit any desired group of rectifiers to be connected to said one load circuit and to prevent a rectifier being included in such group if that rectifier is already connected to any one of the other load circuits.

7. In a control system for alternative sources of supply of electric current for a plurality of load circuits the combination comprising, a first and a second source of current, a series of electromagnets for each of said current sources with each such series including an individual electromagnet for each of the load circuits to provide a pair of corresponding electromagnets for each load circuit, a contact operated by each electromagnet when energized to connect the respective current source to the respective load circuit, a control circuit for each of said series of electromagnets, a selector switch and a manually operable control switch for each of said pair of corresponding electromagnets, said selector switches each provided with a first position to select the respective electromagnet of the series for said first source and a second position to select the respective electromagnet of the series for said second source, means controlled by each of said control switches to connect the electromagnet selected by the respective selector switch with the associated control circuit to energize that electromagnet, and contacts operated by each electromagnet when energized to prevent connection of any of the electromagnets of the same series to the associated control circuit.

SYDNEY ARTHUR STEVENS.